United States Patent [19]
Walsh

[11] 3,819,078
[45] June 25, 1974

[54] SIDE SHIFTER UNITS FOR FORKLIFT TRUCKS

[75] Inventor: Francis J. Walsh, Oakville, Ontario, Canada

[73] Assignee: Erectoweld Company, Limited, Oakville, Ontario, Canada

[22] Filed: Jan. 17, 1973

[21] Appl. No.: 324,336

[30] Foreign Application Priority Data
Mar. 2, 1972   Canada................................ 136020

[52] U.S. Cl. ................................. 214/730, 308/6 R
[51] Int. Cl. ................................................ B66f 9/14
[58] Field of Search ............... 214/730, 16.4 A, 731; 308/3.8, 6 R

[56] References Cited
UNITED STATES PATENTS

| | | | |
|---|---|---|---|
| 730,773 | 6/1903 | Kincaid............................. | 308/6 R |
| 2,142,974 | 1/1939 | Herb.................................. | 308/6 R |
| 2,342,302 | 2/1944 | Rubissow........................... | 308/6 R |
| 3,460,700 | 8/1969 | Kroupa.............................. | 214/730 |

*Primary Examiner*—Robert J. Spar
*Assistant Examiner*—Lawrence J. Oresky
*Attorney, Agent, or Firm*—Fetherstonhaugh & Co.

[57] ABSTRACT

A side shifter unit for a forklift truck according to the present invention includes the improvement of horizontal thrust bearing means which includes at least one pair of roller members each having a cylindrical bearing surface bearing directly against the base plate and the face plate. The thrust bearing means also includes means for retaining the rollers in a spaced parallel relationship with their axes of rotation extending at right angles to the direction of transverse movement of the face plate and guide means for guiding the rollers along a horizontal path parallel to the transverse direction of movement of the face plate, and stop means for limiting the extent of transverse movement of the roller means.

4 Claims, 4 Drawing Figures

3,819,078

SIDE SHIFTER UNITS FOR FORKLIFT TRUCKS

FIELD OF INVENTION

This invention relates to improvements in side shifter units for forklift trucks and the like. In particular, this invention relates to an improved horizontal thrust bearing assembly for side shifter units of forklift trucks and the like.

PRIOR ART

Side shifter units are a valuable addition to forklift truck assemblies as they serve to reduce the number of manoeuvers required in order to accurately locate the forks of a truck when uplifting and discharging loads. One of the problems encountered with the conventional side shifter units is that considerable power is required in order to overcome frictional resistance to transverse movement of the forks when a truck is loaded. Generally the bearings are in the form of strips of bearing material which are interposed between the face plate and the base plate. The frictional loads resulting from the use of this type of bearing have been found to considerably reduce the efficiency of operation of the forklift truck. In particular, where the forklift truck is electrically driven from storage batteries, the working life of the batteries between charges is considerably reduced by the use of the known type of shifter units. It has been proposed to overcome this difficulty by providing roller bearings which are mounted for rotation in one of the plate members so that the face of the roller bears against one of the plates while the shaft of the roller is mounted for rotation in the other plate. With this type of assembly, the load is transferred from one plate to the face of the roller, from there to the roller shaft, and then to the other plate. Generally more than one roller is required in order to distribute the load across the plates and with the type of mounting described above, difficulty is experienced in attempting to ensure that a major portion of the load is not carried by one roller due to the fact that the rollers are not self-alignable in use. In order to overcome these difficulties it is necessary to precision engineer the assembly of the rollers with the result that the cost of producing this type of side shifter unit is considerably greater than that for producing the simple unit employing sliding bearings.

SUMMARY

The side shifter unit of the present invention overcomes the difficulties of the prior art described above by providing a simple and inexpensive horizontal thrust roller bearing assembly which is self-alignable and capable of supporting substantial loads.

According to an embodiment of the present invention, there is provided an improvement in the side shifter unit for a forklift truck wherein the horizontal thrust bearing means includes at least one pair of roller members each having a cylindrical bearing surface bearing directly against the base plate and the face plate. The thrust bearing means also includes means for retaining the rollers in a spaced parallel relationship with their axes of rotation extending at right angles to the direction of transverse movement of the face plate and guide means for guiding the rollers along a horizontal path parallel to the transverse direction of movement of the face plate, and stop means for limiting the extent of transverse movement of the roller means.

PREFERRED EMBODIMENT

The invention will be more clearly understood after reference to the following detailed specification read in conjunction with the drawings, wherein.

Figure 1:
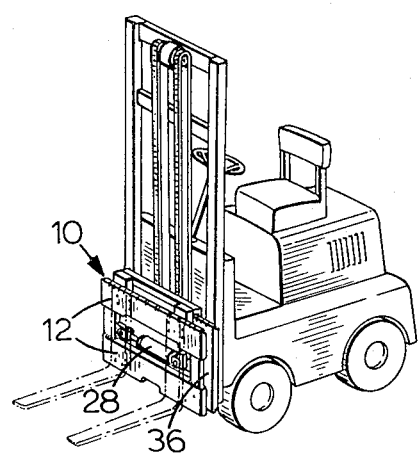
FIG. 1 is a pictorial view of a forklift truck having a side shifter device of the present invention mounted thereon.
Figure 3:
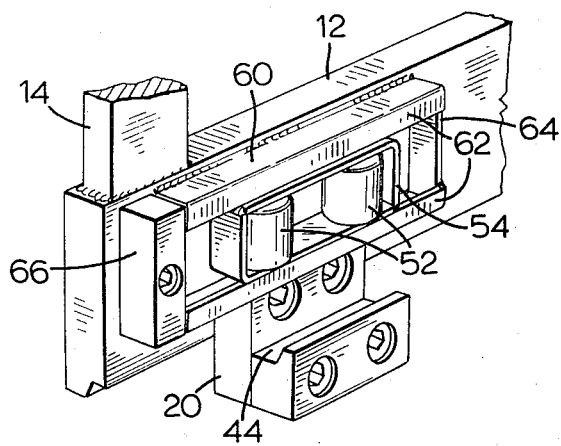
FIG. 3 is an enlarged pictorial view illustrating the manner in which the bearing assembly is mounted on the face plate.
Figure 4:
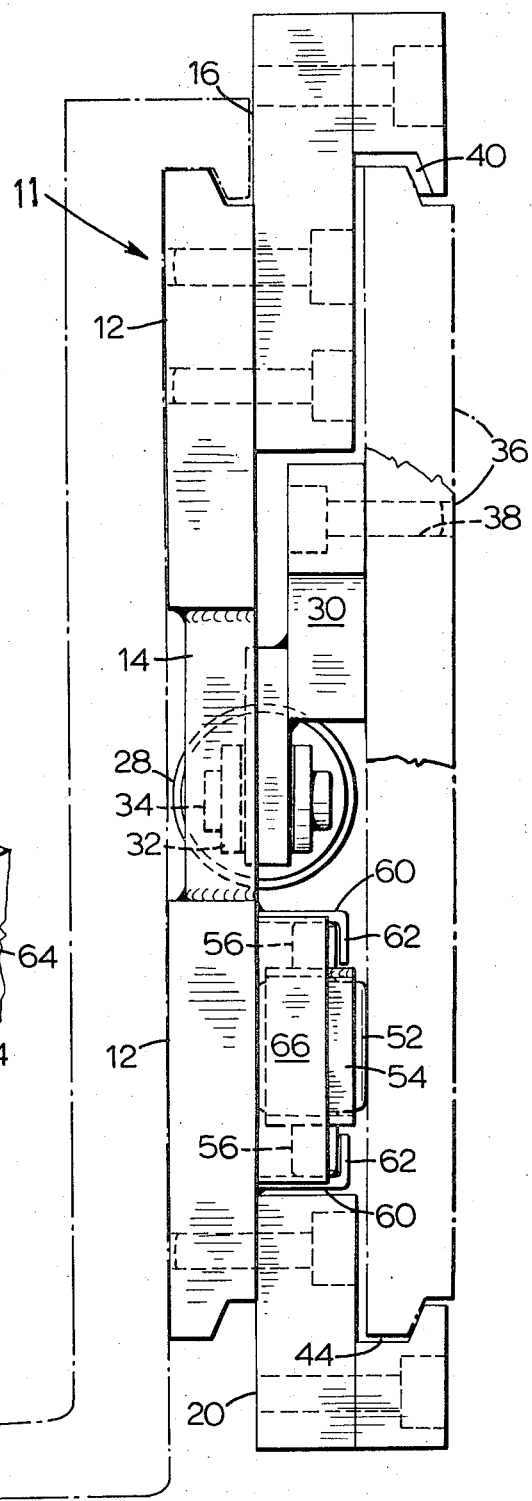
FIG. 4 is an end view of an assembled side shifter according to an embodiment of the present invention.
Figure 2:
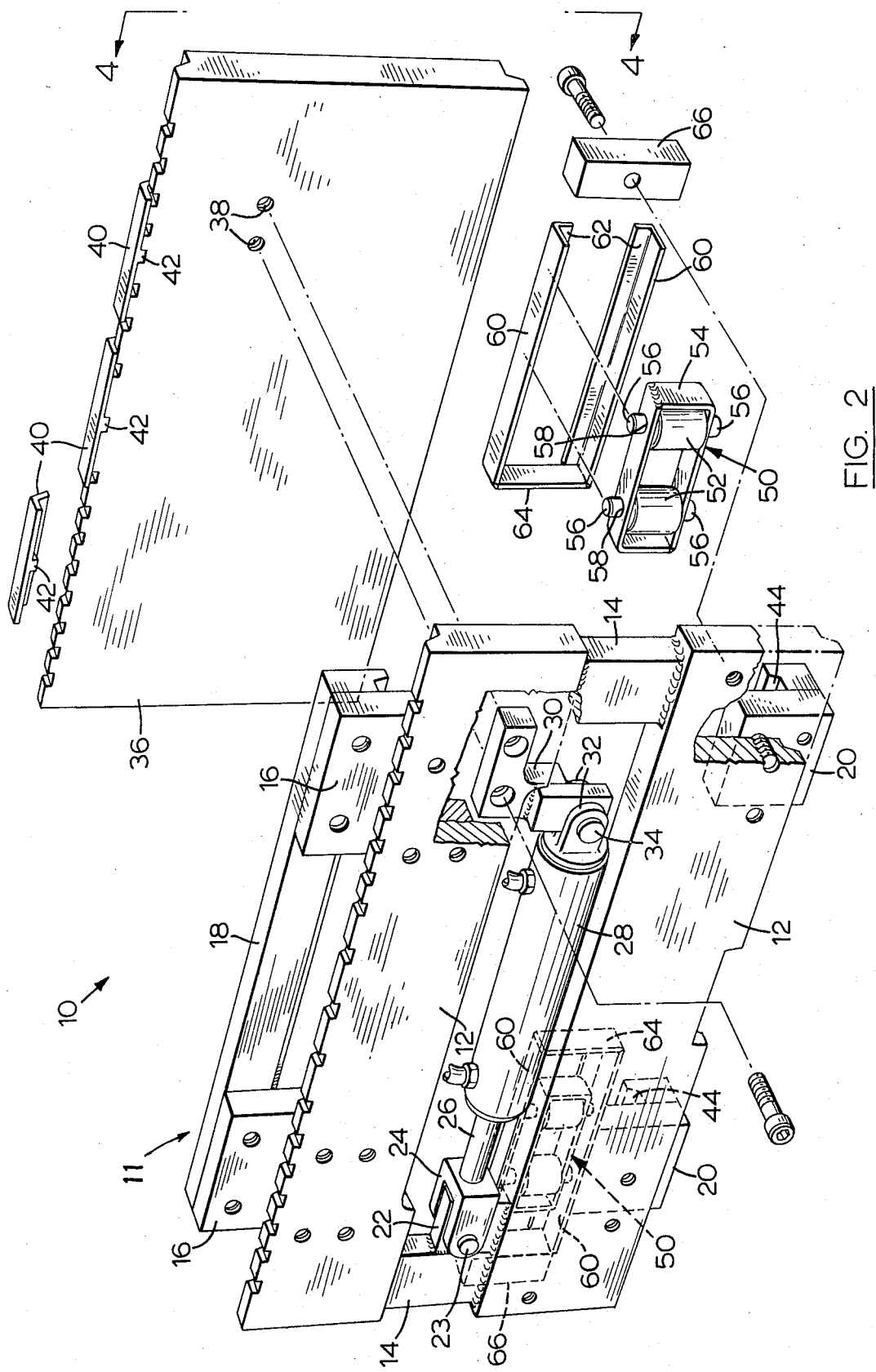
FIG. 2 is an exploded view of a side shifter device of the present invention.

With reference to FIG. 2 of the drawings, the reference numeral 10 refers generally to the side shifter unit for a forklift truck according to an embodiment of the present invention. The unit consists of a pair of transversely extending plates 12 which are spaced from one another and connected by bridge plates 14 which are welded thereto to form a face plate which is generally identified by the reference numeral 11. A pair of upper mounting brackets are connected by a vertical thrust bearing support plate 18 and a pair of lower guide brackets 20. A lug 22 is welded to the face plate adjacent one of the bridge plates 14 and it is connected to the outer end 24 of the piston rod 26 by means of a pivot pin 23. The connecting rod 26 is reciprocally driven by hydraulic cylinder 28. A mounting bracket 30 is connected to the end mounting support 32 of hydraulic cylinder 28 by means of a pivot pin 34. A bracket 30 is adapted to be secured to the base plate 36 of the forklift truck which is provided with threaded passages 38 for this purpose.

Bearing plates 40 fit within the channel formed at the lower end of the vertical thrust support plate 18 and are formed with lugs 42 which fit within the recesses provided in the upper edge of the base plate which are normally used to mount the lifting forks on the base plate. The lower brackets 20 are also formed with a recess channel 44 which slidably receives the lower edge of the base plate.

The apparatus described above has not been described in great detail as the structure is generally known and the novel features of the present invention will now be described in more detail.

In FIG. 2 the reference numeral 50 refers generally to a roller bearing assembly according to an embodiment of the present invention. The assembly includes two rollers 52 and a frame 54. Each of the rollers 52 is formed with a cylindrical main body portion which has a diameter which is greater than the thickness of the frame so that the cylindrical surface of each roller projects outwardly from opposite sides of the frame. The rollers 52 each have shafts 56 formed integrally therewith which are mounted for rotation in passages 58 of the frame 54. Preferably the rollers 52 and their shaft 56 are integrally formed from a case-hardened mild steel material and are, therefore, simple and inexpensive to manufacture. It is not necessary to mount the rollers 52 in roller bearings within the frame 54 in view of the fact that the frame 54 is not subjected to any substantial load and only serves to retain the rollers in a spaced parallel relationship. It will be seen that the frame member is free to pivot about the axes of each roller 52 so that the assembly as a whole is self-aligning.

As shown in FIG. 2 it is preferable to employ two bearing assemblies 50 mounted adjacent each end of the lower base plate 12 by means of L-shaped guide rails 60. Each of the guide rails 60 has an inwardly directed flange portion 62 which overlies the shafts 56 of the rollers. The guide rails 60 guide the roller assemblies 50 along the horizontal path which is parallel to the transverse direction of movement of the face plate. It is important to note that when the rollers are operably located between a base plate 36 and the face plate 11, the bearing surfaces of the rollers bear directly on the face plate and base plate and the axle of the roller is not subjected to any substantial load. The frame 54 simply serves to maintain the rollers in a fixed spaced parallel relationship. The extent of transverse movement of the roller assemblies 50 is limited by stop plates 64 at one end and plates 66 at the other end. The plates 64 may be welded to the rails 60 while the plates 66 are removable to permit the bearing assembly to be operably mounted within the guide rails and to be removed for servicing as required in use.

When the side shifter unit is mounted in a centrally located position on the base plate 36, the roller assemblies 50 are located centrally of the guide rails. When the hydraulic cylinder is activated to move the face plate 11 transversely with respect to the base plate 36, the roller assembly will traverse in the direction of movement of the piston a distance which is half the distance travelled by the face plate. The movement of the face plate 11 in either direction is limited by the range of the hydraulic cylinder and the hydraulic cylinder is preferably adjusted to ensure that the movement of the face plate is within the range of rotating movement of the rollers so as to prevent any skidding of the face plate or base plate with respect to these rollers. Generally the extent of transverse movement required for a side shifter unit is not great and in many cases a hydraulic cylinder having an eight inch stroke providing four inches of travel in either direction is all that is required. It will be noted that the rollers 32 preferably have an external diameter in the range of one to two inches and are capable of supporting substantial loads without distortion.

Various modifications of the present invention will be apparent to those skilled in the art without departing from the scope of the invention. For example, each of the roller assemblies could include three or more rollers mounted within the one frame. However, we have found that one of the advantages of using only two rollers is that they are self-aligning and have proved adequate for most installations.

In a further modification, the shaft portions of the rollers may be removed and the ends of the rollers countersunk so as to receive lugs formed on the frame member to maintain the rollers in the required spaced parallel relationship. These and other modifications will be apparent to the individual skilled in the art.

The embodiments of the invention in which an exclusive property or privilege is claimed are defined as follows:

1. In a side shifter unit for a forklift truck having a vertically movable base plate, a transversely movable face plate, vertical thrust bearing means for supporting the face plate on the base plate, drive means for driving the face plate transversely with respect to the base plate, and horizontal thrust bearing means interposed between the face plate and the base plate to transfer the horizontal component of the load which extends at right angles to the transverse direction of travel of the face plate to the base plate, the improvement wherein, said horizontal thrust bearing means includes at least one bearing assembly comprising
   a. two roller members each having a cylindrical bearing surface bearing directly against said base plate and said face plate,
   b. means including a frame for retaining said rollers in a spaced parallel relationship with their axes of rotation extending at right angles to the direction of transverse movement of the face plate, said rollers being mounted for rotation in said frame and said frame being rotatable about the axis of either roller whereby the frame and roller assembly is self-alignable in use,
   c. and guide means for guiding the rollers along a horizontal path parallel to the transverse direction of movement of the face plate and stop means for limiting the extent of transverse movement of the roller means.

2. A side shifter unit as claimed in claim 1 wherein said guide means for guiding said rollers is mounted on said face plate and includes means for mounting the rollers on the face plate.

3. A side shifter unit as claimed in claim 1 wherein each of said roller members has a solid cylindrical body having integrally formed means for mounting the body for rotation about its axis.

4. A side shifter unit as claimed in claim 1 wherein said horizontal thrust bearing means includes two bearing assemblies.

* * * * *